United States Patent [19]

Yamaoka et al.

[11] Patent Number: 4,587,039

[45] Date of Patent: May 6, 1986

[54] ELECTRICALLY-CONDUCTIVE RESIN COMPOSITION

[75] Inventors: Noboru Yamaoka; Seiju Kezuka, both of Yokohama; Moriya Iida, Yamato; Mituji Miyoshi, Fujisawa; Kazuo Matsuura, Ota, all of Japan

[73] Assignee: Nippon Oil Company, Limited, Tokyo, Japan

[21] Appl. No.: 637,730

[22] Filed: Aug. 6, 1984

[30] Foreign Application Priority Data

Aug. 19, 1983 [JP] Japan .................. 58-150350

[51] Int. Cl.$^4$ ............................................. H01B 1/06
[52] U.S. Cl. ...................... 252/511; 524/495
[58] Field of Search ............ 252/502, 511, 512, 518, 252/520, 521; 524/495, 496; 174/102 SC, 102 SD, 120 SC; 526/125, 123

[56] References Cited

U.S. PATENT DOCUMENTS

| | | | |
|---|---|---|---|
| 4,026,863 | 5/1977 | Oseki et al. | 428/375 |
| 4,321,162 | 3/1982 | Cuffens et al. | 524/495 |
| 4,421,678 | 12/1983 | Mehta | 252/511 |
| 4,481,131 | 11/1984 | Kawai et al. | 252/511 |
| 4,526,707 | 7/1985 | Kutsuwa et al. | 252/511 |

*Primary Examiner*—Josephine L. Barr
*Attorney, Agent, or Firm*—Stevens, Davis, Miller & Mosher

[57] ABSTRACT

Provided is an electrically-conductive resin composition comprising an ethylene/α-olefin copolymer and carbon black, said ethylene/α-olefin copolymer having the following properties (i)–(iv) and being prepared by copolymerizing ethylene with an α-olefin having 3 to 12 carbon atoms in the presence of a catalyst comprising a solid catalyst component and an organoaluminum compound, said solid catalyst component containing at least magnesium and titanium:

(i) Melt index: 0.01–100 g/10 min
(ii) Density: 0.860–0.930 g/cm$^3$
(iii) Maximum peak temperature (Tm) according to Differential Scanning Calorimetry (DSC): not lower than 100° C.
(iv) Percent insoluble in boiling n-hexane: not less than 10 wt. %.

1 Claim, No Drawings

ELECTRICALLY-CONDUCTIVE RESIN COMPOSITION

BACKGROUND OF THE INVENTION

The present invention relates to an electrically-conductive resin composition and more particularly to an electrically-conductive resin composition superior in mechanical strength and heat resistance.

Heretofore, as methods for producing electrically-conductive resins, there have widely been known (1) a method in which the surface of a thermoplastic resin is subjected to zinc spray, application of an electrically-conductive coating material, or plating, and (2) a method in which an electrically-conductive filler is added to a thermoplastic resin.

However, the above methods (1) and (2) involve the following problems. In the method (1), since reprocessing is performed after molding, a long time and extra equipment are required, which leads to an increased cost. As to durability, extensive use would cause deterioration in adhesion and separation between the resin layer and the electrically-conductive surface layer. In the method (2), such separation problem is not encountered, but it is difficult to incorporate an electrically-conductive filler uniformly into the resin and to obtain uniform moldings.

Thermoplastic resins generally employed for the production of electrically-conductive resins are low and high density polyethylenes, polypropylene, polyvinyl chloride and ethylene-vinyl acetate copolymer. All of these resins, upon incorporation therein of an electrically-conductive resin, are poor in uniform dispersibility and it is very difficult or requires a long time to blend and knead both, thus causing problems, e.g. resin deterioration. Besides, those resins have drawbacks attributable to their intrinsic physical properties. For example, polypropylene is low in impact resistance; polyvinyl chloride is deteriorated in physical properties and heat resistance by migration of plasticizer; and ethylene-vinyl acetate copolymer gives off the small of acetic acid during processing.

SUMMARY OF THE INVENTION

It is an object of the present invention to provide an electrically-conductive resin composition superior in mechanical strength and heat resistance.

The present invention resides in an electrically-conductive resin composition comprising an ethylene/α-olefin copolymer and carbon black, said ethylene/α-olefin copolymer having the following properties (i)–(iv) and being obtained by copolymerizing ethylene with an α-olefin having 3 to 12 carbon atoms in the presence of a catalyst comprising a solid catalyst component and an organoaluminum compound which solid catalyst compound contains at least magnesium and titanium:

(i) Melt Index: 0.01–100 g/10 min
(ii) Density: 0.860–0.930 g/cm$^3$
(iii) Maximum peak temperature (Tm) according to Differential Scanning Calorimetry (DSC): not lower than 100° C.
(iv) Percent insoluble in boiling n-hexane: not less than 10 wt.%

DESCRIPTION OF THE PREFERRED EMBODIMENTS

The melt index (determined under the conditions of 190° C., 2.16 kg. according to JIS K 6760; hereinafter referred to as "MI") of the ethylene/α-olefin copolymer used in the present invention is 0.01–100 g/10 min., preferably 0.1–50 g/10 min. Its density (according to JIS K 6760) is 0.860–0.930 g/cm$^3$, preferably 0.870–0.910 g/cm$^3$ and more preferably 0.870–0.900 g/cm$^3$. Its maximum peak temperature (Tm) according to Differential Scanning Calorimetry (DSC) is not lower than 100° C., preferably not lower than 115° C., and its percent insoluble in boiling n-hexane is not less than 10 wt.%, preferably 20 to 95 wt.% and more preferably 20 to 90 wt.%.

Differential Scanning Calorimetry (DSC) and the measurement of percent insoluble in boiling n-hexane were carried out in the following manner.

Differential Scanning Calorimetry (DSC):

A 100–200 μm thick pressed sheet is set on a differential scanning calorimeter and held at 170° C. for 15 minutes in a nitrogen atmosphere, followed by cooling to 0° C. at a temperature lowering rate of 2.5° C./min. Then, the temperature is raised from 0° C. up to 170° C. at a temperature rising rate of 10° C./min. The temperature of the maximum peak appearing during this temperature rising period is measured.

Percent Insoluble in Boiling n-Hexane:

Three 20×30 mm sheets are cut out from a 200 μm thick pressed sheet and used as samples, which are then placed in a double-tube Soxhlet's extractor. After extraction in boiling n-hexane for 5 hours, insoluble matter is dried under reduced pressure (50° C., 5–10 mmHg, 7 hours), and the reduction in weight of each sample after the extraction is measured, from which is calculated the percent insoluble in boiling n-hexane. The mean of the values obtained on the three samples is adopted as percent insoluble in boiling n-hexane.

In the ethylene/α-olefin copolymer used in the present invention, a smaller MI than 0.01 g/10 min. is not desirable because of deterioration in dispersibility and processability of carbon black blended therewith, and a larger MI than 100 g/10 min. is not desirable, either, because of deterioration in tensile and mechanical strengths of molded product. As to the density of the copolymer, a smaller density than 0.860 would cause the surface of molded product to become sticky or cause deterioration in mechanical strength of molded product, and a larger density than 0.930 g/cm$^3$ would cause deterioration in dispersibility of carbon black and deterioration of electrical conductivity. If the maximum peak temperature (Tm) according to DSC is lower than 100° C., the surface of molded product will become sticky or the mechanical strength and heat resistance thereof will be deteriorated, thus making it impossible to obtain a desirable molded product. At a percent insoluble in boiling n-hexane below 10 wt.% the proportion of sticky components increases, and the surface of the molded product becomes sticky, and there easily occurs such a phenomenon as blocking when the resin composition is formed into a film of the like. Further, the heat resistance of the molded product is decreased.

The amount of carbon black to be blended with the copolymer is in the range of 10 to 60 wt.%, preferably 20 to 40 wt.%. If the amount of carbon black is smaller than 10 wt.%, the electrical conductivity will become poor, making it impossible to obtain an electrically-conductive resin having a sufficiently low resistance value, and if it exceeds 60 wt.%, mechanical properties and processability will deteriorate, thus making it impossible to obtain a desirable molded product.

The ethylene/α-olefin copolymer used in the present invention is low in density but exhibits a high maximum peak temperature (Tm) according to DSC, and it is superior in both flexibility and heat resistance and has a high mechanical strength. As to the dispersibility of carbon black, it is generally not easy to disperse carbon black uniformly in resin, and a kneading step which requires the application of a strong force over a long period of time is essential. The higher the proportion of carbon black, the more difficult becomes the kneading step and the poorer the physical properties of the molded product such as a film. Therefore, the addition of additives, such as a plasticizer, is unavoidable for eliminating the trouble involved in processing.

The ethylene/α-olefin copolymer used in the present invention permits an extremely easy kneading thereof with carbon black and extremely easy and uniform dispersion of carbon black therein. Consequently, even if the proportion of carbon black is small, there can be obtained a composition having adequate electrical conductivity.

In the ethylene/α-olefin copolymer used in the present invention, the α-olefin copolymerized with ethylene is $C_3$ to $C_{12}$. Examples are propylene, butene-1,4-methylpentene-1, hexene-1, octene-1, decene-1 and dodecene-1, with propylene, butene-1,4-methylpentene-1 and hexene-1 being particularly preferred.

The following description is now provided about the method of producing the ethylene/α-olefin copolymer used in the present invention.

First, the catalyst used in the copolymerization comprises the combination of a solid material containing at least magnesium and titanium with an organoaluminum compound. As examples of the solid material, mention may be made of those obtained by supporting titanium compounds on magnesium-containing inorganic solid compounds by a conventional method. Examples of such inorganic solid compounds include, in addition to metal magnesium, magnesium hydroxide, magnesium carbonate, magnesium oxide and magnesium, as well as double salts, double oxides, carbonates, chlorides and hydroxides each containing a magnesium atom and a metal selected from silicon, aluminum and calcium, and also these inorganic solid compounds after treatment or reaction with an oxygen-containing compound, a sulfur-containing compound, an aromatic hydrocarbon or a halogen-containing substance.

Examples of the oxygen-containing compound are water, organic oxygen-containing compounds such as alcohols, phenols, ketones, aldehydes, carboxylic acids, esters, polysiloxanes and acid amides, and inorganic oxygen-containing compounds such as metal alkoxides and metal oxychlorides. Examples of the sulfur-containing compound are organic sulfur-containing compounds such as thiols and thioethers, and inorganic sulfur-containing compounds such as sulfur dioxide, sulfur trioxide and sulfuric acid. Examples of the aromatic hydrocarbon are various mono- and polycyclic aromatic hydrocarbons such as benzene, toluene, xylene, anthracene and phenanthrene. Examples of the halogen-containing substance are chlorine, hydrogen chloride, metal chlorides and organic halides.

To exemplify the titanium compound, mention may be made of halides, alkoxyhalides, alkoxides and halogenated oxides of titanium. Tetravalent and trivalent titanium compounds are preferred. Preferred examples of tetravalent titanium compounds are those represented by the general formula $Ti(OR)_nX_{4-n}$ wherein R is an alkyl, aryl or aralkyl group having 1 to 20 carbon atoms, X is a halogen atom and n is $0 \leq n \leq 4$, including titanium tetrachloride, titanium tetrabromide, titanium tetraiodide, monomethoxytrichlorotitanium, dimethoxydichlorotitanium, trimethoxymonochlorotitanium, tetramethoxytitanium, monoethoxytrichlorotitanium, diethoxydichlorotitanium, triethoxymonochlorotitanium, tetraethoxytitanium, monoisopropoxytrichlorotitanium, diisopropoxydichlorotitanium, triisopropoxymonochlorotitanium, tetraisopropoxytitanium, monobutoxytrichlorotitanium, dibutoxydichlorotitanium, monopentoxytrichlorotitanium, monophenoxytrichlorotitanium, diphenoxydichlorotitanium, triphenoxymonochlorotitanium and tetraphenoxytitanium. Examples of trivalent titanium compounds are titanium trihalides obtained by reducing titanium tetrahalides such as titanium tetrachloride and titanium tetrabromide with hydrogen, aluminum, titanium or an organometallic compound of a metal selected from Groups I-III in the Periodic Table, as well as trivalent titanium compounds obtained by reducing tetravalent alkoxytitanium halides of the general formula $Ti(OR)_mX_{4-m}$ with an organometallic compound of a metal selected from Groups I-III in the Periodic Table in which formula R is an alkyl, aryl or aralkyl group having 1 to 20 carbon atoms, X is a halogen atom and m is $0 < m < 4$. Particularly preferred are tetravalent titanium compounds.

Preferred examples of the catalyst are combinations of organoaluminum compounds with such solid material systems as MgO—RX—TiCl$_4$ (see Japanese Patent Publication No. 3514/1976), Mg—SiCl$_4$—ROH—TiCl$_4$ (Japanese Patent Publication No. 23864/1975), MgCl$_2$—Al(OR)$_3$—TiCl$_4$ (Japanese Patent Publication Nos. 152/1976 and 15111/1977), MgCl$_2$—SiCl$_4$—ROH—TiCl$_4$ (Japanese Patent Laid Open Publication No. 106581/1974), Mg(OOCR)$_2$—Al(OR'-)$_3$—TiCl$_4$ (Japanese Patent Publication No. 11710/1977), Mg—POCl$_3$—TiCl$_4$ (Japanese Patent Publication No. 153/1976), MgCl$_2$—AlOCl—TiCl$_4$ (Japanese Patent Publication No. 15316/1979) and MgCl$_2$—Al(OR)$_n$X$_{3-n}$—Si(OR')$_m$X$_{4-m}$—TiCl$_4$ (Japanese Patent Laid Open Publication No. 95909/1981) in which formulae R and R' are each an organic radical and X is a halogen atom.

Other examples of the catalyst are combinations of organoaluminum compounds with reaction products obtained by the reaction of organomagnesium compounds such as Grignard compounds and titanium compounds. As organomagnesium compounds there may be employed, for example, those represented by the general formulae RMgX, R$_2$Mg and RMg(OR) wherein R is an organic radical having 1 to 20 carbon atoms and X is halogen, and ether complexes thereof, as well as these organomagnesium compounds after modification with other organometallic compounds such as, for example, organosodium, organolithium, organopotassium, organoboron, organocalcium and organozinc compounds. More concrete examples are combinations of organoaluminum compounds with such solid material systems as RMgX—TiCl$_4$ (see Japanese Patent Publication No. 39470/1975), RMgX—phenol—TiCl$_4$ (Japanese Patent Publication No. 12953/1979), RMgX—halogenated phenol—TiCl$_4$ (Japanese Patent Publication No. 12954/1979) and RMgX—CO$_2$—TiCl$_4$ (Japanese Patent Laid Open Publication No. 73009/1982).

Further examples of the catalyst are combinations of organoaluminum compounds with solid materials obtained by contacting the above-exemplified solid materials containing at least magnesium and titanium with inorganic oxides such as SiO$_2$ and Al$_2$O$_3$. Other examples of inorganic oxides than SiO$_2$ and Al$_2$O$_3$ include CaO, B$_2$O$_3$ and SnO$_2$. Double oxides of these oxides are also employable. As the method of contacting these inorganic oxides with the solid materials containing magnesium and titanium, there may be adopted a known method. For example, both may be reacted at a temperature of 20° to 400° C., preferably 50° to 300° C., for usually 5 minutes to 20 hours in the presence or absence of an inert solvent, or may be reacted by a co-pulverization treatment or by a combination of these methods. More concrete examples are combinations of organoaluminum compounds with the following solid material systems: SiO$_2$—ROH—MgCl$_2$—TiCl$_4$ (see Japanese Patent Laid Open Publication No. 47407/1981), SiO$_2$—R—O—R'—MgO—AlCl$_3$—TiCl$_4$ (Japanese Patent Laid Open Publication No. 187305/1982) and SiO$_2$—MgCl$_2$—Al(OR)$_3$—TiCl$_4$—Si(OR')$_4$ (Japanese Patent Laid Open Publication No. 21405/1983) in which formulae R and R' are each a hydrocarbon radical.

In the catalyst systems exemplified above, the titanium compounds may be used as adducts with organocarboxylic acid esters, and the magnesium-containing inorganic solid compounds may be used after contact treatment with organocarboxylic acid esters. Moreover, the organoaluminum compounds may be used as adducts with organocarboxylic acid esters. Further, the catalyst preparation may be performed in the presence of an organocarboxylic acid ester.

As examples of the organocarboxylic acid ester, there may be mentioned various aliphatic, alicyclic and aromatic carboxylic acid esters, preferably aromatic carboxylic acid esters having 7 to 12 carbon atoms, including alkyl esters such as methyl and ethyl esters of benzoic, anisic and toluic acids.

Preferred examples of the organoaluminum compound to be combined with the solid material are those represented by the general formulae R$_3$Al, R$_2$AlX, RAlX$_2$, R$_2$AlOR, RAl(OR)X and R$_3$Al$_2$X$_3$ wherein R, which may be alike or different, is an alkyl, aryl or aralkyl group having 1 to 20 carbon atoms and X is a halogen atom, including triethylaluminum, triisobutylaluminum, trihexylaluminum, trioctylaluminum, diethylaluminum chloride, diethylaluminum ethoxide, ethylaluminum sesquichloride, and mixtures thereof.

The amount of the organoaluminum compound used is not specially limited, but usually it is in the range of 0.1 to 1,000 moles per mole of the titanium compound.

The catalyst may be contacted with an α-olefin before its use in the polymerization reaction, whereby the polymerization activity can be greatly improved and a stabler operation is ensured than in the omission of such treatment. Various α-olefins are employable. Preferred examples are α-olefins having 3 to 12, more preferably 3 to 8, carbon atoms, including propylene, butene-1, pentene-1,4-methylpentene-1, hexene-1, octene-1, decene-1, dodecene-1, and mixtures thereof. The temperature and time of the contact treatment between the catalyst and α-olefin can be selected over a wide range.

For example, both may be contacted at a temperature of 0° to 200° C., preferably 0° to 110° C., for 1 minute to 24 hours. The amount of α-olefin to be contacted can also be selected over a wide range, but it is desirable to treat the catalyst with 1 to 50,000 g., preferably 5 to 30,000 g., of α-olefin per gram of the solid material so that 1 to 500 g. of α-olefin per gram of the solid material is allowed to react. The contact pressure is not specially limited, but preferably it is in the range of $-1$ to 100 kg/cm$^2$.G.

The contact treatment with α-olefin may be carried out by first combining the total amount of the thus-prepared catalyst with the α-olefin. Alternatively, it may be performed by first combining a part of the organoaluminum compound with the solid material, then contacting this mixture with the α-olefin and adding the remaining organoaluminum compound separately at the time of polymerization reaction. Further, this α-olefin treatment for the catalyst may be conducted in the presence of hydrogen gas or other inert gas such as nitrogen, argon or helium.

The polymerization reaction is carried out in the same way as in conventional olefin polymerization reactions using Ziegler type catalysts. More particularly, the reaction is performed in a substantially oxygen- and water-free condition, in vapor phase, or in the presence of an inert solvent or using monomers as solvents. Olefin polymerizing conditions involve temperatures in the range of 20° to 300° C., preferably 40° to 200° C., and pressures in the range of atmospheric pressure to 70 kg/cm$^2$.G, preferably 2 to 60 kg/cm$^2$.G. The molecular weight can be adjusted to some extent by changing polymerization conditions such as the polymerization temperature and the catalyst mole ratio, but the addition of hydrogen into the polymerization system is more effective for this purpose. Of course, two or more multistage polymerization reactions involving different polymerization conditions such as different hydrogen concentrations and different polymerization temperatures can be performed without any trouble.

Thus, by using the ethylene/α-olefin copolymer obtained by copolymerizing ethylene and C$_2$ to C$_{12}$ α-olefin in the presence of the catalyst comprising the solid material containing magnesium and titanium and the organoaluminum compound, in combination with carbon black, there can be obtained the electrically-conductive composition of the invention having superior characteristics. This is quite unexpected and surprising.

As copolymers similar to the ethylene/α-olefin copolymer used in the present invention there have been known ethylene/α-olefin copolymers prepared using vanadium catalysts. But, these similar copolymers are clearly different from the copolymers used in the present invention. Even on the same density level, the former is low in the maximum peak temperature (Tm) according to DSC, and its percent insoluble in boiling n-hexane is zero to trace, while that of the copolymer used in the present invention is not less than 10 wt.%. In comparison with the copolymers prepared using vanadium catalysts, the copolymer used in the present invention is superior in heat resistance and mechanical strength, which is attributable to the above differences between the two. Further, a catalyst removing step is essential to the former because the vanadium compound remaining as residual catalyst in the copolymer is toxic, while the use of titanium as in the present invention does not cause the problem of toxicity and its combination with the magnesium compound affords a high activity catalyst, the use of which dispenses with the catalyst removing step. This is extremely economical.

The carbon black used in the present invention is not specially limited. It may be one commonly used such as furnace black or channel black. Particularly, carbon black having a small average particle diameter and a large specific surface area is preferred because its use even in a small amount can impart a high electrical conductivity to the resin.

The electrically-conductive resin composition of the present invention may contain other electrically-conductive filler than carbon black, for example, fine metal powder, metal fiber or carbon fiber. Further, other resins and additives may be added if necessary, for example, low and high density polyethylenes, polypropylene and petroleum resin, as well as additives usually employed within the range not impairing electrical conductivity such as inorganic filler, antioxidant, lubricant, antistatic agent and pigment.

The composition of the present invention can be kneaded in a conventional manner using a kneading apparatus such as rolls, Henschel mixer or Bumbury's mixer, or a single- or twin-screw extruder.

The following examples are given to further illustrate the present invention, but the invention is not limited thereto.

Various items of measurement will be referred to in those examples, of which the following items were not explained on their measuring method in the foregoing description so will now be explained.

Volume Resistivity:

Measured according to the wheatstone bridge method defined in SRIS 2301-1969.

Dispersibility of Carbon Black:

Measured visually using a microscope with respect to a 10 um thick film sample.

Tensile Strength:

Measured at a pulling rate of 50 mm/min according to JIS K 6301.

EXAMPLE 1

Ethylene and butene-1 were copolymerized using a catalyst comprising a solid catalyst component and triethylaluminum, the solid catalyst component consisting of a substantially anhydrous magnesium chloride, 1,2-dichloroethane and titanium tetrachloride, to obtain an ethylene/butene-1 copolymer. 70 wt.% of the ethylene/butene-1 copolymer and 30 wt.% of carbon black ("Ketjen Black EC", a product of Japan EC Co.) were blended by a Bumbury's mixer and then pelletized by an extruder. Then, using a hot press, a 1.5 mm thick sheet was prepared and measured for various physical properties, results of which are as set out in Table 1.

EXAMPLES 2 AND 3

Resin compositions were prepared in the same way as in Example 1 except that the blending ratio of the copolymer used in Example 1 and carbon black was changed as shown in Table 1, and various physical properties were measured, results of which are as set out in the same table.

EXAMPLES 4 AND 5

Using the catalyst described in Example 1, ethylene and butene-1 were copolymerized to obtain an ethylene/butene-1 copolymer having MI, density, etc. different from those of the copolymer prepared in Example 1. Then, resin compositions were prepared in the same way as in Example 1 except that the copolymer just prepared was used, and physical properties were measured, results of which are as set out in Table 1.

EXAMPLE 6

Ethylene and propylene were copolymerized using a catalyst comprising a solid catalyst component and triethylaluminum, the solid catalyst component consisting of a substantially anhydrous magnesium chloride, anthracene and titanium tetrachloride, to obtain an ethylene-propylene copolymer. Then, a resin composition was prepared in the same way as in Example 1 except that 70 wt.% of the ethylene-propylene copolymer just prepared and 30 wt.% of carbon black ("Ketjen Black EC", a product of Japan EC Co.), and physical properties were measured, results of which are as set out in Table 1.

COMPARATIVE EXAMPLE 1

A resin composition was prepared in the same way as in Example 1 except that the ethylene/butene-1 copolymer was substituted by a mixture of 50 parts by weight of a high pressure process low density polyethylene (LDPE) (MI: 1.0 g/10 min., density: 0.925 g/cm$^3$, maximum peak temperature (Tm) according to DSC: 112° C.) and 50 parts by weight of an ethylenevinyl acetate copolymer (EVA) (vinyl acetate content: 12%, MI: 0.75 g/10 min., density: 0.945 g/cm$^3$, Tm: 90° C.), and physical properties were measured, results of which are as set out in Table 1.

COMPARATIVE EXAMPLE 2

Ethylene and butene-1 were copolymerized using the catalyst described in Example 1 to obtain an ethylene/butene-1 copolymer having a density (0.940 g/cm$^3$) outside the claimed scope of the present invention. Then, a resin composition was prepared in the same way as in Example 1 except that the copolymer just prepared was used, and physical properties were measured, results of which are as set out in Table 1.

COMPARATIVE EXAMPLE 3

A resin composition was prepared in the same way as in Example 1 except that the ethylene/butene-1 copolymer was substituted by an ethylene-propylene copolymer (Mooney viscosity: $ML_{100}$· $C.^{1+4}23$) prepared using a vanadium catalyst, and physical properties were measured, results of which are as set out in Table 1.

TABLE 1

| | Thermoplastic Resin | | | | | Amount of Carbon Black wt. % | Tensile Strength Kgf/cm$^2$ | Volume Resistivity Ω · cm | Dispersability |
|---|---|---|---|---|---|---|---|---|---|
| | Kind | MI g/10 min | Density g/cm$^3$ | Tm °C. | C$_6$ Insoluble*[1] wt. % | Amount wt. % | | | | |
| Example 1 | Ethylene/butene-1 copolymer | 1.4 | 0.900 | 120 | 77 | 70 | 30 | 205 | 8 × 10$^3$ | O |

TABLE 1-continued

| | | Thermoplastic Resin | | | | Amount of Carbon Black wt. % | Tensile Strength Kgf/cm$^2$ | Volume Resistivity Ω · cm | Dispersability |
|---|---|---|---|---|---|---|---|---|---|
| | Kind | MI g/10 min | Density g/cm$^3$ | Tm °C. | C$_6$ Insoluble*[1] wt. % | Amount wt. % | | | |
| 2 | Ethylene/butene-1 copolymer | " | " | " | " | 80 | 20 | 219 | $7 \times 10^4$ | O |
| 3 | Ethylene/butene-1 copolymer | " | " | " | " | 50 | 50 | 180 | $3 \times 10^2$ | O |
| 4 | Ethylene/butene-1 copolymer | 1.0 | 0.920 | 124 | 97 | 70 | 30 | 260 | $9 \times 10^4$ | O |
| 5 | Ethylene/butene-1 copolymer | 0.3 | 0.893 | 119 | 61 | " | " | 150 | $5 \times 10^3$ | O |
| 6 | Ethylene/propylene copolymer | 1.0 | 0.890 | 122 | 60 | " | " | 102 | $2 \times 10^3$ | O |
| Comparative Example | | | | | | | | | | |
| 1 | LDPE/EVA 1:1 blend | 1.2 | 0.932 | — | — | " | " | 105 | $1 \times 10^6$ | X |
| 2 | Ethylene/butene-1 copolymer | 1.0 | 0.940 | 126 | 99 | " | " | 305 | $9 \times 10^5$ | Δ |
| 3 | Ethylene/propylene copolymer rubber | 1.9 | 0.864 | non | 0 | " | " | 15 | $5 \times 10^5$ | Δ |

*[1]Insoluble in boiling n-hexane
O . . . superior
Δ . . . somewhat inferior
X . . . inferior

What is claimed is:

1. An electrically-conductive resin composition consisting essentially of an ethylene/α-olefin copolymer, wherein said α-olefin is propylene, butene-1,4-methylpentene-1 or hexene-1, and 10 to 60 weight percent based on the total weight of the composition of carbon black, said ethylene/α-olefin copolymer having the following properties (i)-(iv) and being prepared by copolymerizing ethylene with said α-olefin in the presence of a catalyst comprising a solid catalyst component and an organoaluminum compound, said solid catalyst component containing at least magnesium and titanium:
   (i) Melt index: 0.01-100 g/10 min
   (ii) Density: 0.870-0.910 g/cm$^3$
   (iii) Maximum peak temperature (Tm) according to Differential Scanning Calorimetry (DSC): not lower than 100° C.
   (iv) Percent insoluble in boiling n-hexane: not less than 10 wt. %.

* * * * *